Jan. 29, 1963 G. B. MILLER 3,076,058
INDUCTIVE LOOP COMMUNICATION SYSTEMS
Filed July 15, 1960
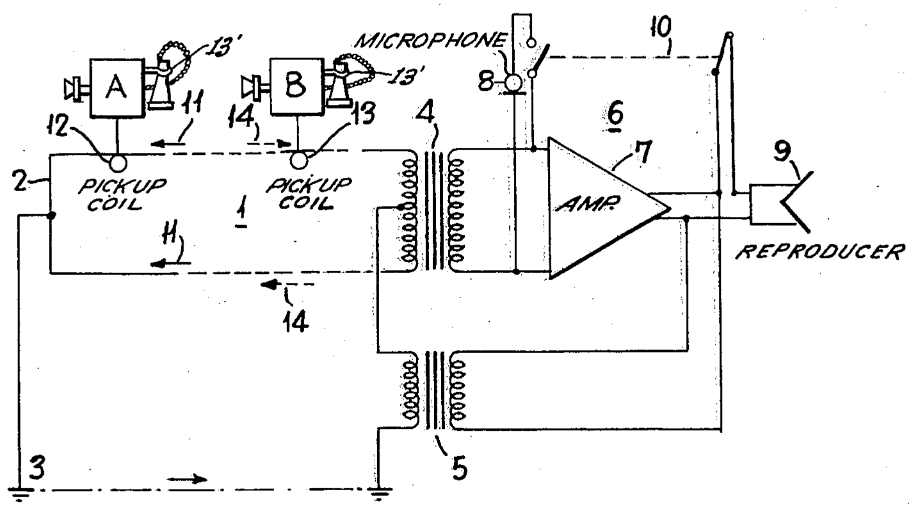
INVENTOR -
George Bertram Miller
By: Miles D. Pillars
Attorney United States Patent Office 3,076,058
Patented Jan. 29, 1963

3,076,058

INDUCTIVE LOOP COMMUNICATION SYSTEMS

George Bertram Miller, Bilton, Rugby, England, assignor to Associated Electrical Industries Limited, London, England, a British company Filed July 15, 1960, Ser. No. 43,035
Claims priority, application Great Britain July 17, 1959
4 Claims. (Cl. 179—82)

This invention relates to a communication system employing an inductive loop on which the signals are impressed, and is particularly adapted for effecting intercommunication between a fixed or ground station and one or more relatively movable stations associated with the loop.

In inductive loop communication systems of the kind referred to, as generally practiced, signals from the ground station are fed into the inductive loop and are picked up at one or more movable stations by means of pick-up coils associated with the loop. The pick-up coils may also serve as a means for impressing signals on the loop where connections between the movable station and the ground station, or between the movable stations, is required. The term "pick-up coil" must be read with this dual function in view. When the movable stations are movable along a fixed path, the loop is in the form of two conductors arranged parallel to the path and interconnected at their opposite ends, the pick-up coils being symmetrically disposed with respect to the two conductors forming the loop so that signal currents flowing round the loop induce currents in the pick-up coils which are communicated to a sound reproducer, e.g. loud-speaker; amplification of the signals being resorted to, as required. In such a known arrangement, the pick-up coils at the relatively movable stations are connected by switching means to the sound reproducer so that each of these stations is normally connected for receiving signals; the ground station switch being similarly set to a position such that signals impressed on the loop from any one of the relatively movable stations will be audible in the sound reproducer at the ground station.

In the event that one of the relatively movable stations requires to communicate with the ground station or with one of the other stations, the switching device at the talking station is moved to a position which connects a microphone through an amplifier at the station to the pickup coil so that signals are again fed into the loop. Although there are considerable losses in the coupling between the pick-up coil and the loop, inter-communication between a relatively movable station and the ground station is satisfactory since their coupling losses occur only once; but inter-communication between the relatively movable stations is less satisfactory owing to the fact that the coupling losses are doubled since they occur between the transmitting pick-up coil and the loop and again between the loop and the receiving pick-up coil.

According to the invention, in a communication system of the inductive loop type, a first inductive loop with which the pick-up coil associated with the, or each, relatively movable station is inductively coupled forms one side of a second inductive loop into which signals to be communicated are fed by way of a stationary amplifier, signals induced in the first loop being fed into the stationary amplifier and from the output of the amplifier into the second loop through a coupling arrangement which ensures that the signals, when fed into the second loop, do not cause feed-back, the pick-up coils associated with the, or each, relatively movable station being asymmetrically disposed with respect to the conductors forming the first loop so as to be preferentially coupled to one side only thereof.

The stationary amplifier may be the one directly associated with the ground station; in this case the level of signal strength will be greater when inter-communication between the ground station and a relatively movable station is taking place, than when inter-communication between relatively movable stations is being effected. This is generally not important; but if a uniform signal level throughout is required, the ground station may be coupled to the first loop through a pick-up coil in the same manner as the coupling to that loop from the relatively movable station is effected.

To enable the two conductors of the first inductive loop to form one side of the second inductive loop, electrically balanced points on the first loop are connected to a third conductor, which may be ground, the point at the end of the first loop nearest the stationary amplifier being obtained from the centre-tap of the primary winding of a transformer, the secondary winding of which forms the input to the amplifier. By this means, signals fed into the second loop from the output of the amplifier by way of a connection including the centre-tap of the transformer produce no input to the amplifier. Signals may be fed into the second loop by way of a transformer, the primary winding of which is fed from the output of the amplifier while the secondary winding is in the second loop. Signals induced in the first loop by a pick-up coil are thus applied through the centre-tapped transformer to the input to the amplifier, the output from which is fed into the second loop; this output may also be fed into a sound reproducer where the stationary amplifier forms part of the ground station.

Suitable switching means of known type is used in connection with each station to allow for transmission and reception, the switches being normally left in position for receiving.

Thus, according to a further feature of the invention, a communication system of the inductive loop type consists of a first inductive loop with which the pick-up coils associated with each of a plurality of stations are inductively coupled, said coils being preferentially coupled to one only of the conductors of the loop, said loop forming one side of a second loop into which signals to be communicated are fed after amplification, the signals being impressed on the second loop through a connection including the centre-tap of the primary winding of a transformer which terminates one end of the first inductive loop, and the secondary winding of the transformer being coupled to the input to the amplifier so that signals impressed on the first loop from a pick-up coil are thereby fed to the second loop and are induced in the pick-up coils.

The invention will now be described with reference to the accompanying drawing which shows diagrammatically an arrangement in accordance therewith.

In the particular embodiment illustrated the stationary amplifier is also acting as the ground station amplifier.

The first inductive loop is shown at 1. The conductors of the loop are interconnected at one end 2, which end is connected to ground at 3. At the other end, the conductors of the loop 1 are connected to the primary winding of a centre-tapped transformer 4, the centre-tap being connected to ground by way of the secondary winding of a transformer 5. The centre-tap and the ground connection at 2 are electrically balanced. The loop 1 and ground thus form the two sides of a second inductive loop. A ground station is indicated generally at 6. It includes an amplifier 7 or other signal input device, a microphone 8 and a signal reproducer 9, e.g. loud-speaker, together with the transformers 4 and 5. Switching means, generally indicated at 10, is arranged either to connect the microphone 8 to the input of amplifier 7, or to connect the output from amplifier 7 to the reproducer 9. When, therefore, the ground station 6 is in the transmitting condition signals produced by the microphone 8 are amplified by the amplifier 7 and are coupled, by way of transformer 5, into the second loop, the signal current flowing in parallel through the two conductors of the loop 1, as indicated by the arrows 11.

Associated with each of the relatively movable stations, A, B, is a pick-up coil, of which 12 and 13 are indicated as applying to two movable stations. Pick-up coils 12, 13 are preferentially coupled to one side of the inductive loop 1 by being in proximity to one of the conductors of the loop, as indicated by the asymmetric position of the coils with respect to the loop conductors. Signals to be communicated, applied to the primary winding of transformer 5, will be induced into the pickup-coils 12, 13.

Switching means, which may comprise any suitable conventional device such as a telephone hook switch 13' at each station A and B, is associated with each of the relatively movable stations so that the output from the pick-up coils 12, 13 is fed to the amplifier, and thence to the reproducer, at each of the relatively movable stations.

Should either of these stations desire to communicate with the, or each, other such station, or with the ground station 6, the connections at the appropriate station are switched so that the signal input device provides the input to the local amplifier, and the output of the amplifier is connected to the associated pick-up coils 12, 13. Signal currents are thereby induced in the conductors of the first inductive loop 1 in the direction indicated by the interrupted arrows 14. These signal currents will flow through the primary winding of transformer 4, the secondary of which is connected to the input of amplifier 7, and after amplification will be coupled into the second inductive loop through transformer 5. By this means, amplified signal currents affect the pick-up coils 12, 13 and proceed to the amplifier of the station which is not transmitting. Simultaneously, the signals will be made audible in the reproducer 9 associated with the ground station. Owing to the amplification provided by amplifier 7, signals transmitted from one of the relatively movable stations will readily be audible in any other such station.

While the signals have been referred to as audible signals, they can, of course, be made to operate indicating lamps or other devices, if required, provided such devices are substituted for the reproducers at the stations.

The system is particularly useful in connection with travelling cranes; the conductors of the inductive loop 1 are then mounted, in known manner, adjacent the path of the crane, and the pick-up coil associated with the equipment on the crane and if desired that associated with the ground station, is then positioned asymmetrically with respect to the centre line of the conductor pair of the loop 1 so as to be preferentially coupled to one conductor of the pair.

If there is a small difference between the impedances of the two halves of the primary winding of transformer 4, tending to produce oscillatory action, conventional external balancing techniques can be employed.

What I claim is:

1. A two-way communication system comprising a fixed transmitter-receiver station, at least one movable transmitter-receiver station, a stationary amplifier forming part of said fixed station, a first inductive loop, said first loop consisting of spaced conductors located along the path of movement of said movable station and connected in parallel, said parallel connection at one end including a centre-tapped winding and at the other end a direct connection between said spaced conductors, a second inductive loop, a part of said second loop comprising the parallelled conductors of said first loop connected in said second loop by way of said centre-tap and said direct connection, means feeding output signals from said amplifier into said second loop so that said signals pass in parallel through the conductors constituting said first loop, a winding inductively associated with said centre-tapped winding for applying signals circulating in said first loop only to the input of said amplifier, and means preferentially coupling said movable station to one only of said parallelled conductors of said first loop.

2. A two-way communication system as claimed in claim 1, in which the connection to said centre-tap and forming part of said second loop includes the secondary winding of a transformer the primary winding of which is fed from the output of said stationary amplifier.

3. A two-way communication system as claimed in claim 2 and having a signal input device connectible to the input of said stationary amplifier, a signal reproducing device connectible to the output of said amplifier, and switching means for selectively connecting said signal input device or said signal reproducing device to the amplifier.

4. A two-way communication system comprising a first inductive loop, said loop consisting of two spaced conductors connected in parallel to provide electrically balanced points, a second inductive loop, said second loop including between said electrically balanced points of said first loop the conductors of said first loop, a fixed transmitter-receiver station including a stationary amplifier, coupling means including one of said balanced connections between said first inductive loop and the input to said amplifier whereby said amplifier receives the signals circulating in said first loop, means feeding the output from said amplifier into said second loop so that signals amplified in said amplifier are applied in parallel to the conductors constituting said first loop, and at least one movable transmitter-receiver station preferentially coupled to one only of said conductors of said first loop.

References Cited in the file of this patent

UNITED STATES PATENTS 2,596,013 Doriot ---------------- May 6, 1952

FOREIGN PATENTS 1,042,660 Germany ------------- Nov. 6, 1958